US010509507B2

(12) United States Patent
Yamasaki

(10) Patent No.: US 10,509,507 B2
(45) Date of Patent: Dec. 17, 2019

(54) DISPLAY DEVICE, INFORMATION PROCESSING APPARATUS, METHOD FOR CONTROLLING DISPLAY DEVICE, AND STORAGE MEDIUM

(71) Applicant: CANON KABUSHIKI KAISHA, Tokyo (JP)

(72) Inventor: Shozo Yamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/428,911

(22) Filed: Feb. 9, 2017

(65) Prior Publication Data

US 2017/0242530 A1   Aug. 24, 2017

(30) Foreign Application Priority Data

Feb. 22, 2016   (JP) ................. 2016-030670

(51) Int. Cl.
| | | |
|---|---|---|
| *H04N 1/00* | (2006.01) | |
| *G06F 3/041* | (2006.01) | |
| *G02F 1/1333* | (2006.01) | |
| *G06F 3/0488* | (2013.01) | |

(52) U.S. Cl.
CPC ........ *G06F 3/0416* (2013.01); *G02F 1/13338* (2013.01); *G06F 3/04886* (2013.01); *H04N 1/00411* (2013.01); *H04N 1/00474* (2013.01); *H04N 2201/0094* (2013.01)

(58) Field of Classification Search
CPC ............... G06F 3/0416; G06F 3/04886; G02F 1/13338; H04N 1/00411; H04N 1/0474; H04N 2201/0084

USPC ........................................................ 345/173
See application file for complete search history.

(56) References Cited

U.S. PATENT DOCUMENTS 4,992,779 A * 2/1991 Sugino .................. G06F 3/0488
                                                      341/20
2012/0154851 A1* 6/2012 Rothery ................ G06F 1/1626
                                                      358/1.15

FOREIGN PATENT DOCUMENTS

| JP | H11-312054 A | 11/1999 |
|---|---|---|
| JP | 2000-250710 A | 9/2000 |
| JP | 2006-330303 A | 12/2006 |
| JP | 2013-016114 A | 1/2013 |

* cited by examiner

*Primary Examiner* — Mark W Regn
(74) *Attorney, Agent, or Firm* — Canon USA, Inc., IP Division

(57) ABSTRACT

If a user operates a touch panel, a display device notifies the user of a factor of change into a state in which a touch operation has been accepted to restore a state in which a normal touch operation is accepted. The display device monitors coordinate information output from the touch panel, and if it is determined that an operation disabled area located in a first touch panel area excluding the position of an assigned key has entered a state of being designated and a second touch panel area has entered a state of being designated, displays, on a display screen, that the operation disabled area has been designated. The display device thereby notifies the user that operations are not accepted because of a touch operation.

6 Claims, 11 Drawing Sheets

DISPLAY DEVICE, INFORMATION PROCESSING APPARATUS, METHOD FOR CONTROLLING DISPLAY DEVICE, AND STORAGE MEDIUM

BACKGROUND

Field

The present disclosure relates to a display device, an information processing apparatus, a method for controlling a display device, and a storage medium.

Description of the Related Art

Users of information processing apparatuses such as smartphones, tablet personal computers (PCs), and personal digital assistants (PDAs) have been increasing recently. Information processing apparatuses incorporating a touch panel as an input device are becoming common.

For example, a touch panel incorporated in an information processing apparatus is mounted on a display device such as a liquid crystal display (LCD). If the user makes a predetermined touch operation via the touch panel, a request for an operation of the information processing apparatus is accepted.

For example, the user makes touch operations to implement functions such as scrolling of a display area with respect to a display image displayed on the LCD and scaling of the display area.

Among touch panels, there is a typical type of a touch panel using a panel configured so that two opposed layers of resistive films inside are electrically connected to each other at a pressed point (hereinafter, referred to as a resistive film type touch panel).

To calculate the pressed point of the touch panel, a constant voltage is applied to one electrode of the upper resistive film. The other electrode is grounded. A voltage value at the pressed point is detected via the lower resistive film to calculate a coordinate value in an X-axis (Y-axis) direction.

On the foregoing resistive film type touch panel, desired coordinate values can be calculated if the user touches a single point of the touch panel.

If the user simultaneously touches a plurality of points on the touch panel, one average point of the touched positions is calculated. For example, if the user's palm accidentally touches the touch panel while the user is making a touch operation with a fingertip, the coordinate values of the position touched with the fingertip are unable to be calculated.

To prevent erroneous input due to the touching of a plurality of points on the resistive film type touch panel, a technique has been discussed for disabling touch operations if touches are detected at a plurality of points (see Japanese Patent Application Laid-Open No. 2000-250710).

Such control disables touch operations without exception, even if the user unintentionally touches a plurality of points. Since touch operations are disabled while the user is making an intended operation, the user can mistakenly think that the apparatus is broken.

What is needed is a mechanism that, if a user operates a touch panel, can notify the user of a factor of change into a state in which a touch operation is not accepted to restore a state in which a normal touch operation is accepted.

SUMMARY

According aspects of embodiments, a display device includes a touch panel configured to include a first touch panel area for accepting an instruction to a key assigned to a specific position and a second touch panel area for accepting an instruction to a key displayed on a display screen, a determination unit configured to monitor coordinate information output from the touch panel and determine whether an operation disabled area, located in the first touch panel area excluding the specific position of the assigned key, has entered a state of being designated and the second touch panel area has entered a state of being designated, and a first display control unit configured to, if the operation disabled area is determined to have bed designated and the second touch panel area is determined to has entered a state of being designated, display, on the display screen, that the operation disabled area is designated.

Further features will become apparent from the following description of exemplary embodiments with reference to the attached drawings.

DESCRIPTION OF THE EMBODIMENTS

An exemplary embodiment will be described with reference to the drawings.

[Description of System Configuration]

Figure 1:
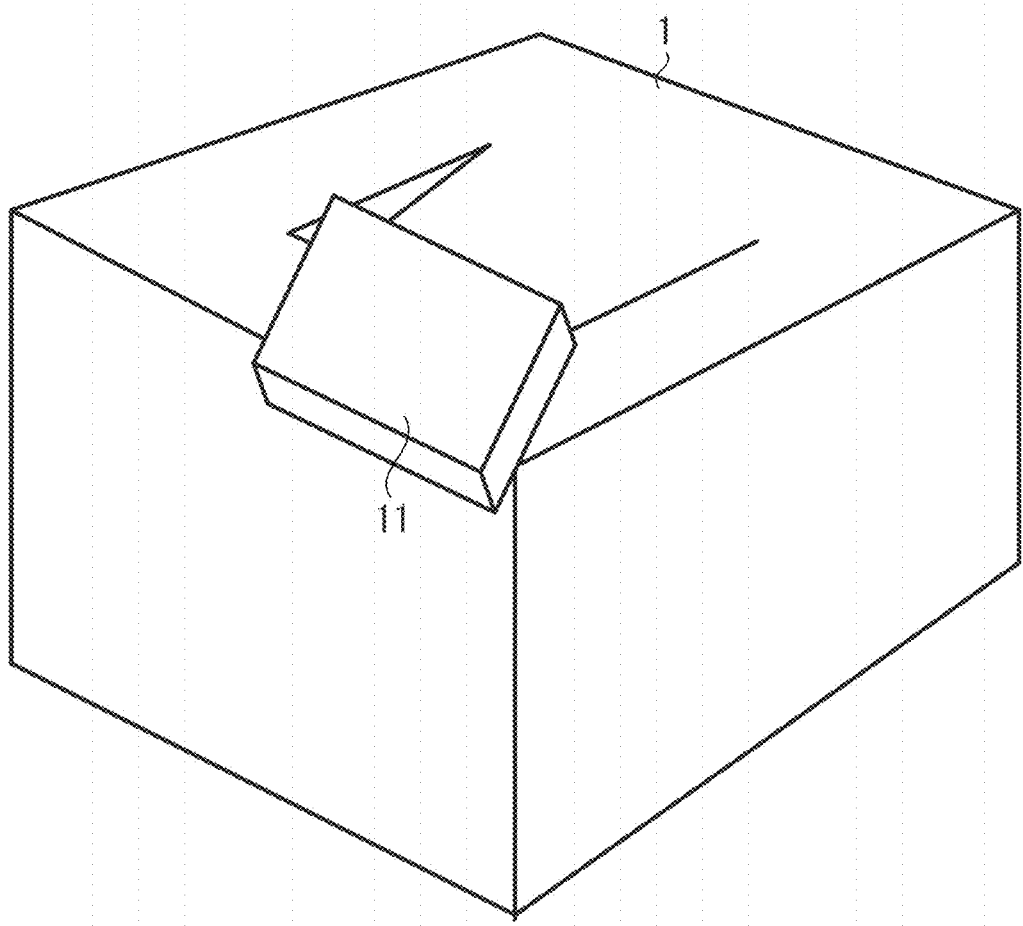
FIG. 1 is an external view illustrating a configuration of an information processing apparatus including a display device.

A first exemplary embodiment will be described below. FIG. 1 is an external view illustrating a configuration of an information processing apparatus including a display device according to the present exemplary embodiment. In the present exemplary embodiment, a multifunctional peripheral (MFP) including a plurality of functions will be described as an example of the information processing apparatus. As employed herein, the plurality of functions is associated with specific functions executable by an MFP 1, including a copy function, a scan function, a send function, a box function, and a facsimile function.

In FIG. 1, the MFP 1 includes an operation panel 11. The user uses the operation panel 11 when checking a state of the MFP 1 or setting a predetermined job.

The operation panel 11 is connected to the MFP 1. The operation panel 11 can be configured to be changeable in angle (tiltable). The operation panel 11 can be configured to be fixed in angle. If the operation panel 11 is configured to be tiltable, the operation panel 11 is connected with the MFP 1 via a not-illustrated hinge member. For example, the user can grip an edge portion of the operation panel 11 and move the edge portion up/down to change the operation panel 11 to a desired angle.

Figure 2:
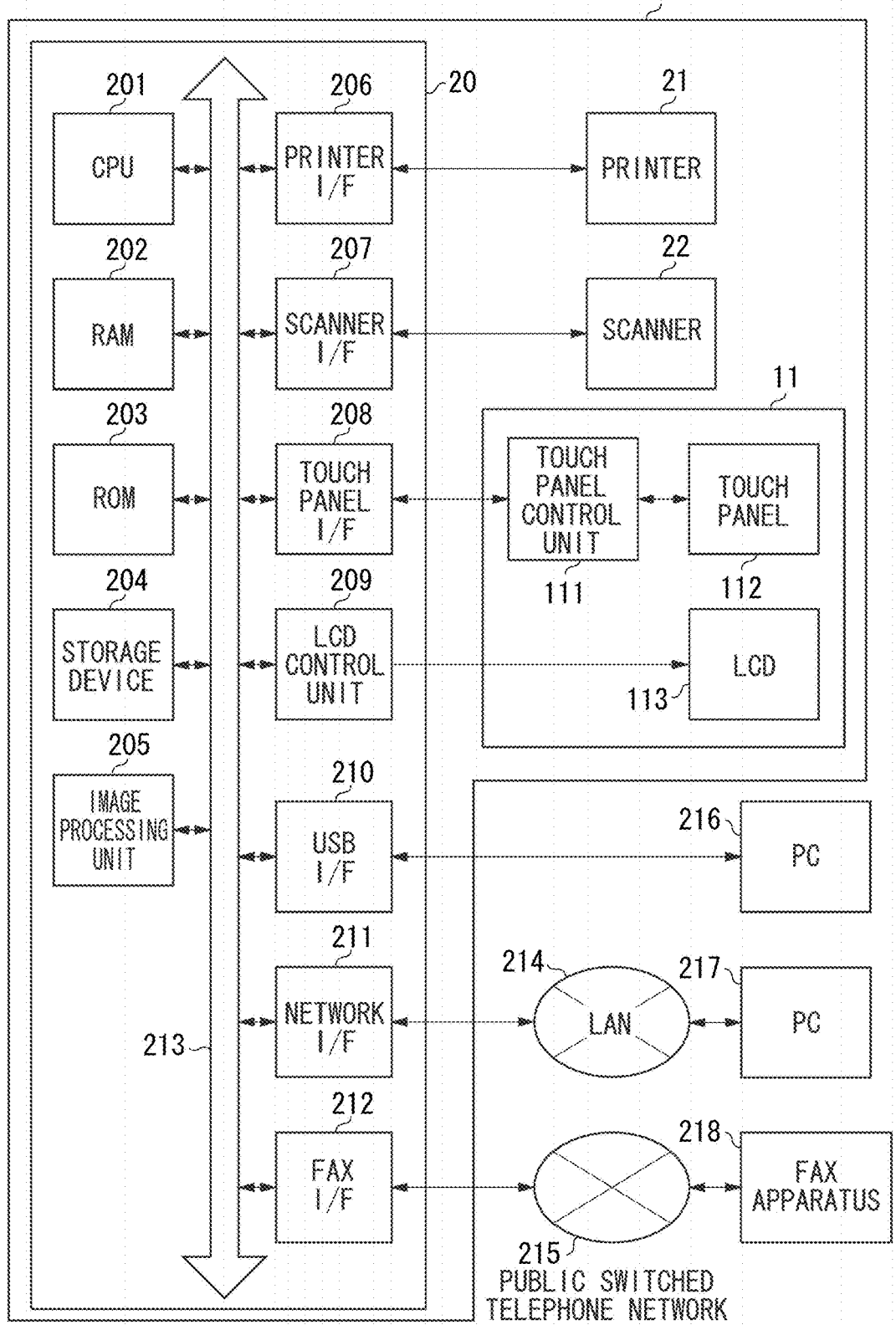
FIG. 2 is a block diagram illustrating a hardware configuration of a multifunctional peripheral (MFP).

FIG. 2 is a block diagram illustrating a hardware configuration of the MFP 1 illustrated in FIG. 1. The MFP 1 according to the present exemplary embodiment includes a control unit 20, a printer 21, a scanner 22, and the operation panel 11. Such units operate in a coordinated manner to implement printing, scan, copy, facsimile (FAX), and other functions.

In FIG. 2, the control unit 20 includes a central processing unit (CPU) 201, a random access memory (RAM) 202, a read-only memory (ROM) 203, a storage device 204, an image processing unit 205, a printer interface (I/F) 206, a scanner I/F 207, a touch panel I/F 208, and an LCD control unit 209. The control unit 20 also includes a Universal Serial Bus (USB) I/F 210, a network I/F 211, and a FAX I/F 212. Such blocks are connected by a system bus 213.

The operation panel 11 includes a touch panel control unit 111, a touch panel 112, and an LCD 113 to be described below. The touch panel control unit 111 and the touch panel 112 are connected to the touch panel I/F 208. The LCD 113 is connected to the LCD control unit 209.

The CPU 201 controls the foregoing blocks in a comprehensive manner according to various control programs. The various control programs are stored in a program area of the ROM 203, and read and executed by the CPU 201. Alternatively, compressed data stored in the program area of the ROM 203 is decompressed and loaded into the RAM 202 for execution. The RAM 202 is also used as an image memory for storing image data to which the image processing unit 205 applies various types of image processing during printing.

The ROM 203 also stores graphic data to be displayed on the LCD 113. The LCD control unit 209 reads the graphic data stored in the ROM 203 (or moved from the ROM 203 to the RAM 202) and transfers the graphic data to the LCD 113 at predetermined display timing determined by the LCD 113.

The storage device 204 is a nonvolatile secondary storage device for storing large-sized programs and data. The large-sized programs and data stored are loaded into the RAM 202 for use. The storage device 204 can store the foregoing various control programs and graphic data in a compressed or uncompressed state.

The printer I/F 206 connects the printer 21 (printer engine) and the control unit 20. The printer 21 performs print processing on a sheet fed from a sheet cassette (not illustrated) based on print data input via the printer I/F 206.

The scanner I/F 207 connects the scanner 22 and the control unit 20. The scanner 22 reads a placed document to generate and output image data. The image data output from the scanner 22 is printed by the printer 21, stored in the storage device 204, or transmitted to external apparatuses via external I/Fs 210, 211, and 212.

The external I/Fs 210, 211, and 212 enable communication with external apparatuses. A FAX I/F 212 is connected to the Public Switched Telephone Network 215 via a modular jack. The FAX I/F 212 performs FAX transmission and reception with a FAX apparatus 218. A network I/F 211 is connected to a local area network (LAN) 214 via a LAN I/F connector. The network I/F 211 performs network communication with a PC 217. A USB I/F 210 is locally connected to and performs USB communication with a PC 216 via a USB connector.

Figure 3:
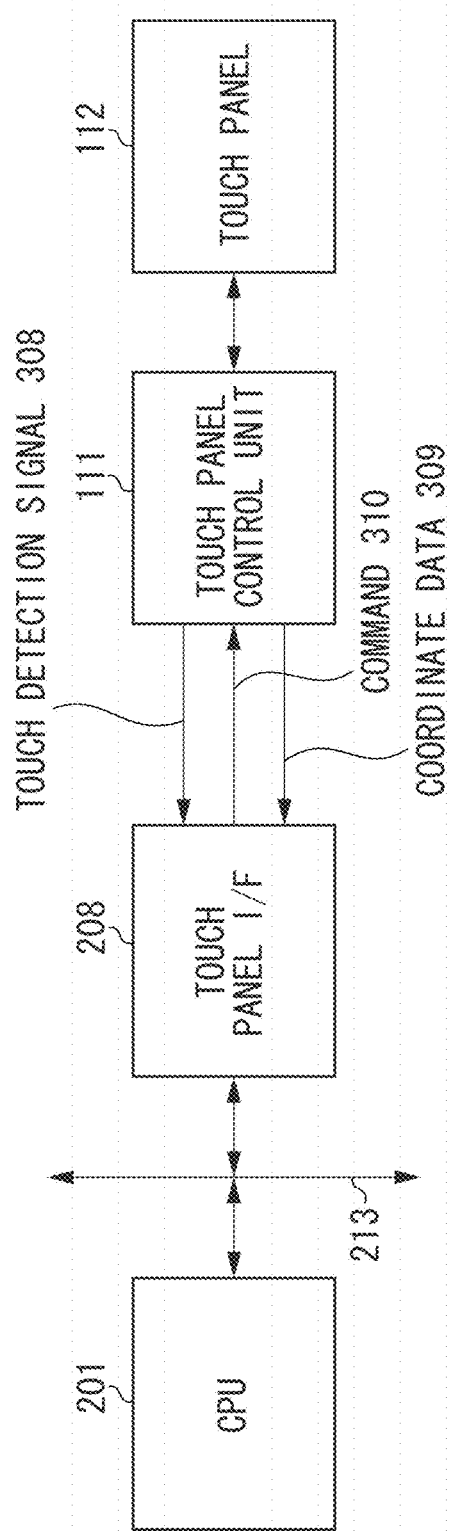
FIG. 3 is a block diagram illustrating communication processing between a touch panel control unit and a control unit.

FIG. 3 is a block diagram illustrating communication processing between the touch panel control unit 111 and the control unit 20 illustrated in FIG. 2.

In FIG. 3, the touch panel I/F 208 includes a not-illustrated internal timer which is activated by an instruction from the CPU 201. According to settings of the internal timer, the CPU 201 transmits a command 310 for requesting measurement of voltage values on X- and Y-axes of the touch panel 112.

The touch panel I/F 208 receives X- and Y-axis coordinate data 309 corresponding to the transmitted command 310 from the touch panel control unit 111. The touch panel I/F 208 can write the received coordinate data 309 inside so that the CPU 201 can refer to the written coordinate data 309. The touch panel I/F 208 can transfer and store the received coordinate data 309 into the RAM 202.

The touch panel control unit 111 receives the command 310 from the touch panel I/F 310 and performs voltage measurement on the X- and Y-axes of the touch panel 112. The touch panel control unit 111 converts the results obtained by the voltage measurement into voltage values by a not-illustrated analog-to-digital (A/D) converter in the touch panel control unit 111, and transmits the voltage values as the coordinate data 309 to the touch panel I/F 208.

The touch panel control unit 111 monitors for any change in the voltages of the touch panel 112, even while not receiving the command 310. If there is a change in voltage, the touch panel control unit 111 transmits a touch detection signal 308 to the touch panel 208.

If the user is not touching the touch panel 112, the voltages on the X- and Y-axes of the touch panel 112 remain constant and unchanged. For example, when not receiving the command 310, the touch panel control unit 111 fixes the touch detection signal 308 to high (or low). If the touch panel control unit 111 detects a change in voltage on the X- or Y-axis of the touch panel 112 while not receiving the command 310, the touch panel control unit 111 fixes the touch detection signal 308 to low (or high).

If the touch detection signal 308 changes from high to low (or low to high), the CPU 201 determines that the user is touching the touch panel 112. The CPU 201 continues transmitting the command 310 from the touch panel I/F 208 and detecting the coordinate data 309 while the touch detection signal 308 is changed.

The touch detection signal 308 need only to be such that the CPU 201 can detect the user's touch on the touch panel 112 while the touch panel control unit 111 does not receive the command 310. The method of control is not limited in particular.

Figure 4:
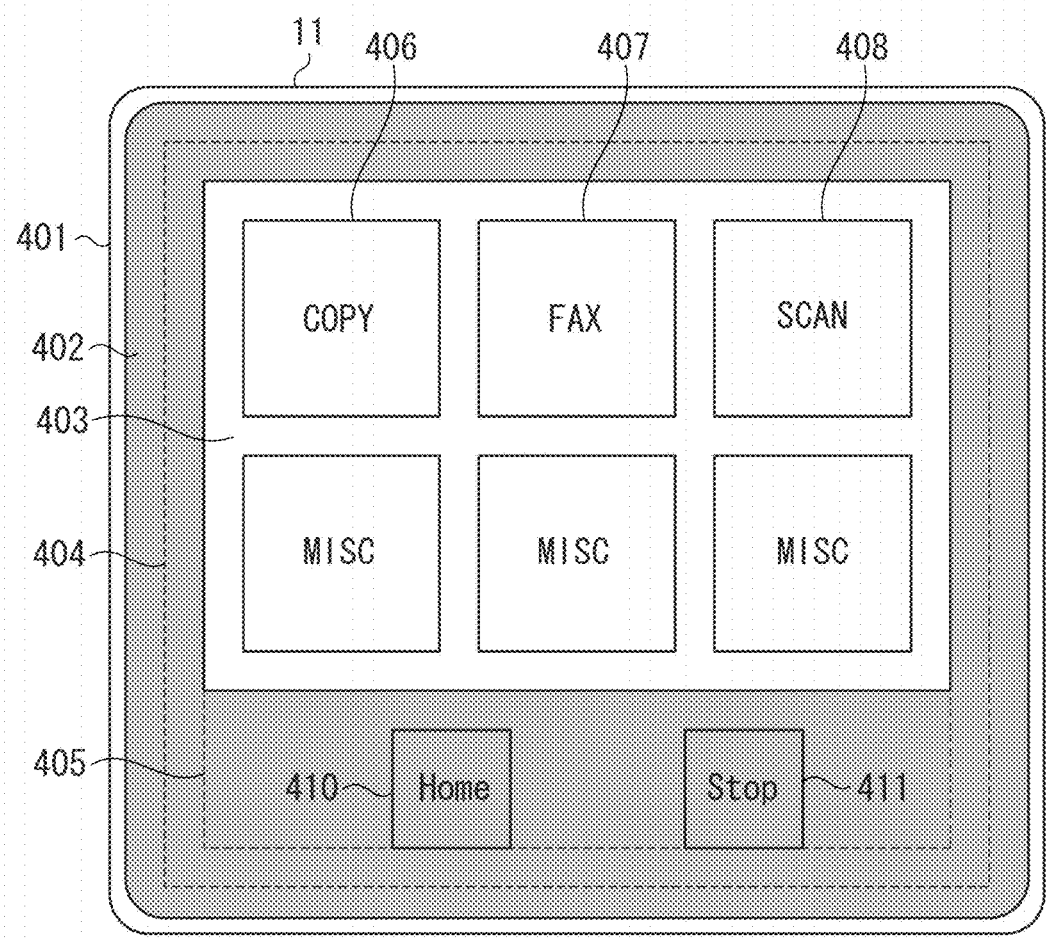
FIG. 4 is a diagram illustrating a configuration of an operation panel.

FIG. 4 is a diagram illustrating a configuration of the operation panel 11 illustrated in FIG. 2. A touch panel area will be described below.

In FIG. 4, the operation panel 11 includes an external cover 401 and a decoration film 402. The decoration film 402 is arranged on the touch panel 112. For example, the decoration film 402 is attached to the touch panel 112 with an adhesive.

The decoration film 402 is printed and colored in areas to be touched, except a display area 403 of the LCD 113, so that the areas under the decoration film 402 are not visible to the user. The display area 403 of the LCD 113 is not colored or printed, so that the user can view a screen displayed on the LCD 113 and arranged under the display area 403 from above through the decoration film 402.

The touch panel 112 includes a display area 404. A touch sensor area 405 is formed on the touch panel 112. If the user touches the touch sensor area 405 from above the decoration area 402, the touch detection signal 308 of FIG. 3 changes and the CPU 201 can detect the coordinate data 309. The LCD 113 is arranged under the touch panel 112 to fit the display area 403.

If the operation panel 11 displays a home screen, keys 406, 407, and 408 are displayed on the screen of the LCD 113. For example, if the user touches and releases a copy key 406, the CPU 201 presents a display indicating that the copy key 406 has been clicked and displays a copy operation screen (not illustrated) via the control unit 20.

Keys 410 and 411 are laid out and printed on the decoration film 402. For example, if the user operates the copy key 406 to display the copy operation screen and, in such a state, touches a home key 410, the home screen is displayed instead of the copy operation screen displayed on the LCD 113.

While the decoration film 402 is so described, other members can be arranged on the touch panel 112 instead as long as the touch sensor area 405 can detect a user's touch.

Key operations inside the touch sensor area 405 are disabled except on the keys 406, 407, and 408 in the display area 403 and the keys 410 and 411 printed on the decoration film 402. If the user touches such a key operation disabled area (operation disabled area) where key operations are disabled, the CPU 201 detects the coordinate data 309 on the touch panel 112, but does not make any operation on the operation panel 11.

For example, suppose that the user grips a lower left portion of the operation panel 11 on the left of the home key 410 by the left hand and attempts to change the angle of the operation panel 11. In such a case, the CPU 201 performs control to not make any operation on the operation panel 11.

If the user grips the lower left portion of the operation panel 11 by the left hand as described above and attempts a key operation with the right hand, the touch panel 112 is touched at a plurality of points. The touch panel control unit 111 is not able to read accurate coordinate data on the key operation of the right hand.

If, for example, no operation is made here and the user is unaware that the left hand is touching the touch sensor area 405, the user can consider that the key operation attempted with the right hand gets no response. The user may mistakenly think that the MFP 1 is broken.

The area inside the touch sensor area 405 other than the display area 403 is colored by the printing of the decoration film 402. The user is thus not able to determine whether it is inside the touch sensor area 405.

In the present exemplary embodiment, if the user touches the key operation disabled area inside the touch sensor area 405 excluding the display area 403, the touch panel control unit 111 then detects whether the coordinate data 309 changes while the user is touching the touch panel 112.

If the touch panel control unit 111 detects a change in the coordinate data 309, the touch panel control unit 111 recognizes that the user, while touching the key operation disabled area, makes an additional touch on the touch sensor area 405. The touch panel control unit 111 then displays a message 501 illustrated in FIG. 5 on the screen of the LCD 113 for user notification. The touch panel control unit 111 thereby notifies the user that the user is making an operation while touching the key operation disabled area and is unable to make a normal key operation. Alternatively, the touch panel control unit 111 can display a key operation disabled area image 502 illustrated in FIG. 5 on the screen of the LCD 113 to inform the user of the key operation disabled area. Informed that the left hand is touching the key operation disabled area, the user can release the left hand from the screen and continue the operation instruction by the right hand. Even if the user makes a key operation while unintentionally touching the key operation disabled area, such a display control can prevent the MFP 1 from being erroneously recognized to be broken.

Figure 5:
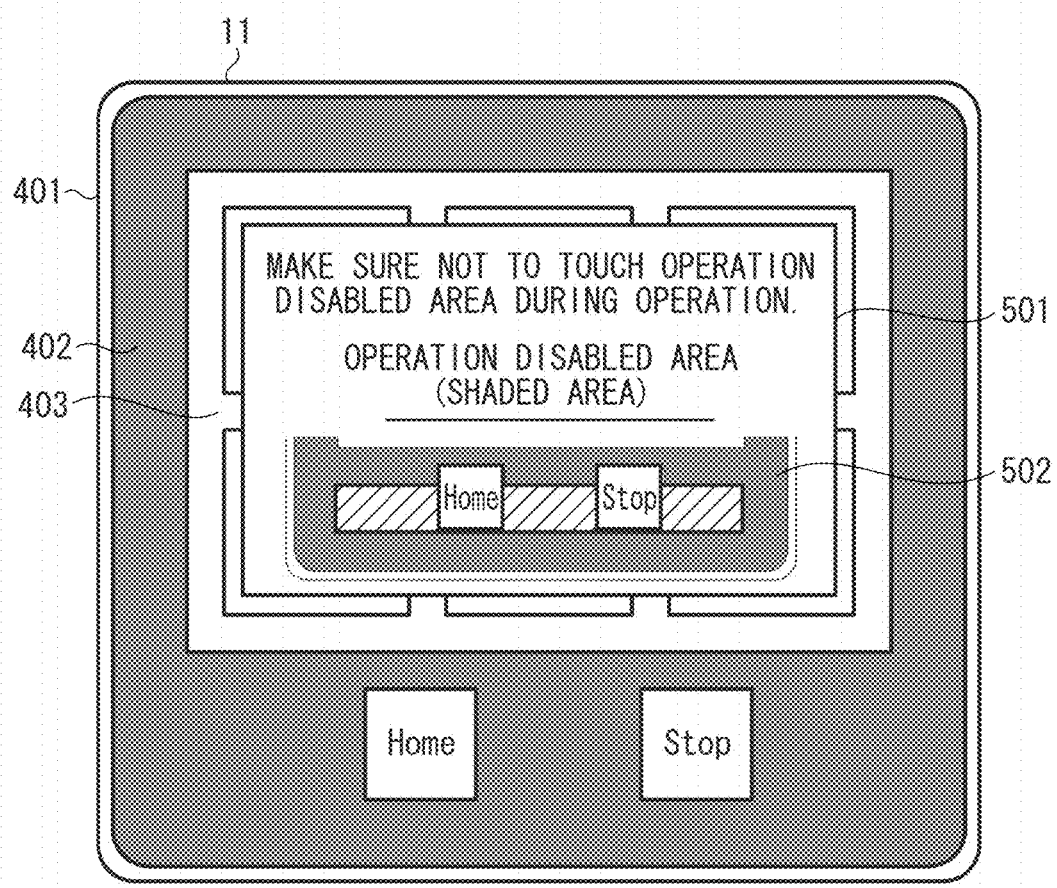
FIG. 5 is a diagram illustrating a message for notifying a user of a touch operation state.

The message 501 illustrated in FIG. 5 is controlled to not be displayed if the user simply touches the key operation disabled area. The user may happen to touch the key operation disabled area with only the intention of changing the angle of the operation panel 11. In such a case, the notification of the message 501 illustrated in FIG. 5 is not made. In other words, the message 501 illustrated in FIG. 5 is displayed only if the user attempts an additional key operation while touching the key operation disabled area.

In the present exemplary embodiment, two-point touch operations are described as an example of touch operations on a plurality of points of the touch sensor area 405. However, the touch panel control unit 111 can be one capable of a plurality, e.g., two, of touch operations. In such a case, the present exemplary embodiment is applied to cases where three or more points are touched, which the foregoing touch panel control unit 111 capable of two-point touch operations is not able to detect. The plurality of points is therefore not limited to a particular number.

[Example of Touch Detection Processing]

Figure 6:
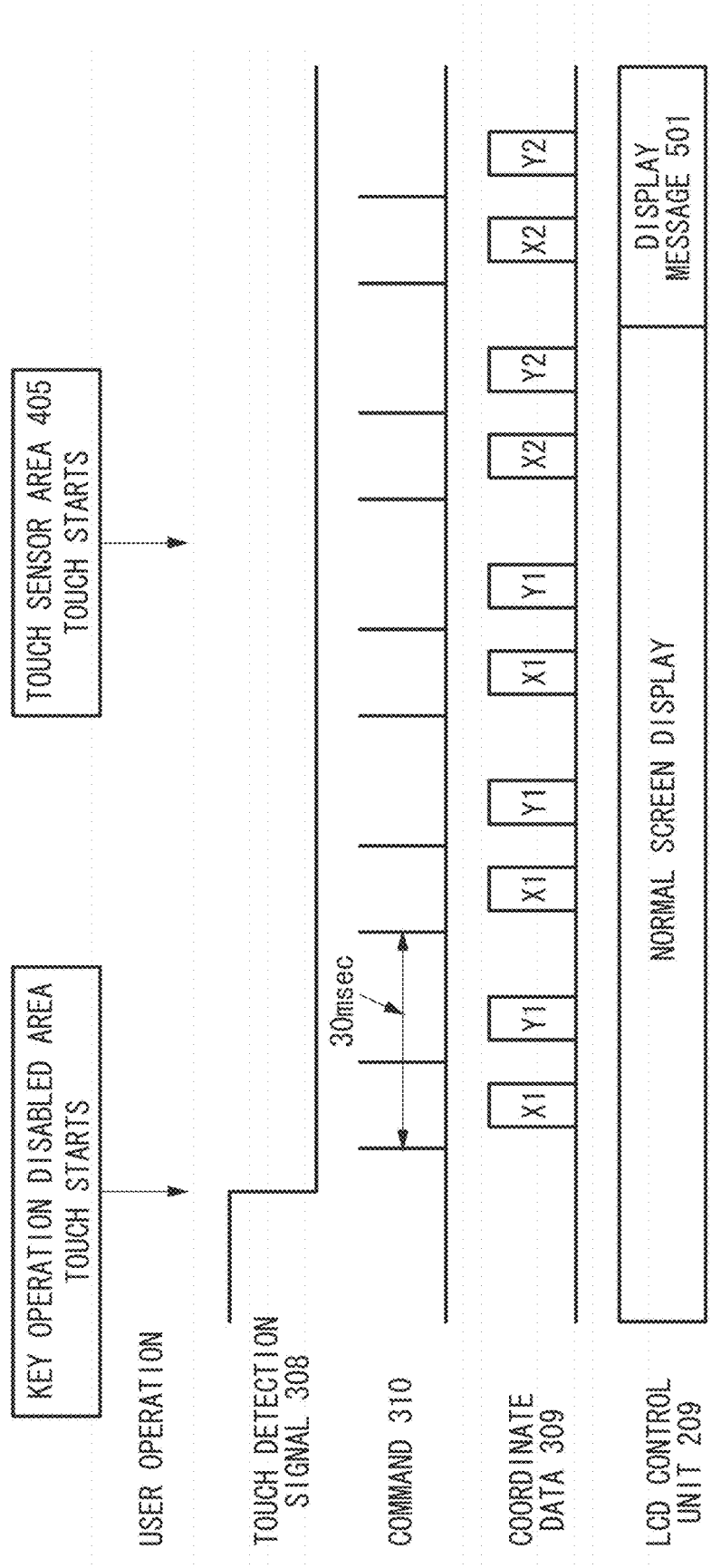
FIG. 6 is a timing chart illustrating an operation for detecting touch operations.

FIG. 6 is a timing chart illustrating a touch detection state of the touch panel control unit 111 illustrated in FIG. 3. Specifically, FIG. 6 illustrates an example of touch detection processing when the user touches the touch sensor area 405 while touching the key operation disabled area illustrated in FIG. 5.

In FIG. 6, the CPU 201 initially checks via the touch panel control unit 111 that the touch detection signal 308 is high, in a state in which the user is not touching the touch sensor area 405. If the CPU 201 detects via the touch panel control unit 111 that the touch detection signal 308 changes from high to low, the CPU 201 transmits the command 310 to the touch panel control unit 111.

The command 310 is for requesting the coordinate data 309 on the X-axis of the touch sensor 504 and then requests the coordinate data 309 on the Y-axis from the touch panel control unit 111. According to the received command 310, the touch panel control unit 111 transmits the coordinate data 309 on the X- and Y-axes, (X1, Y1), to the CPU 201.

The CPU 201 determines from the voltage values of the coordinate data 309 that the point touched by the user is in the key operation disabled area. The CPU 201 then continues transmitting the command 310 to detect the coordinate data 309 via the touch panel control unit 111 while the touch detection signal 308 is low, i.e., while the user touches the touch sensor area 405. The command 310 can be transmitted at intervals specified by an internal timer of the touch panel I/F 208. The CPU 201 can transmit the command 310 at predetermined timing.

During the intervals of transmission of the command 310 by the CPU 201, the CPU 201 having transmitted the command 310 receives the coordinate data 309 via the touch panel control unit 111 and determines the contents of the coordinate data 309. The duration of time for the determination can be as long as the control of detecting the touch detection signal 308 can be reflected, e.g., 30 msec.

The duration of time for which the control of the CPU 201 to get ready to transmit a new command 310 after detecting the touch detection signal 308 can be reflected may be, for example, 30 msec.

If the user then touches the touch sensor area 405, the coordinate data 309 on the X- and Y-axes, (X2, Y2), changes. The CPU 201 determines that the user touches the touch sensor area 405. The CPU 201 displays the message 501 illustrated in FIG. 5 on the screen of the LCD 113 via the LCD control unit 209.

[First Key Touch Input Processing]

Figure 7:
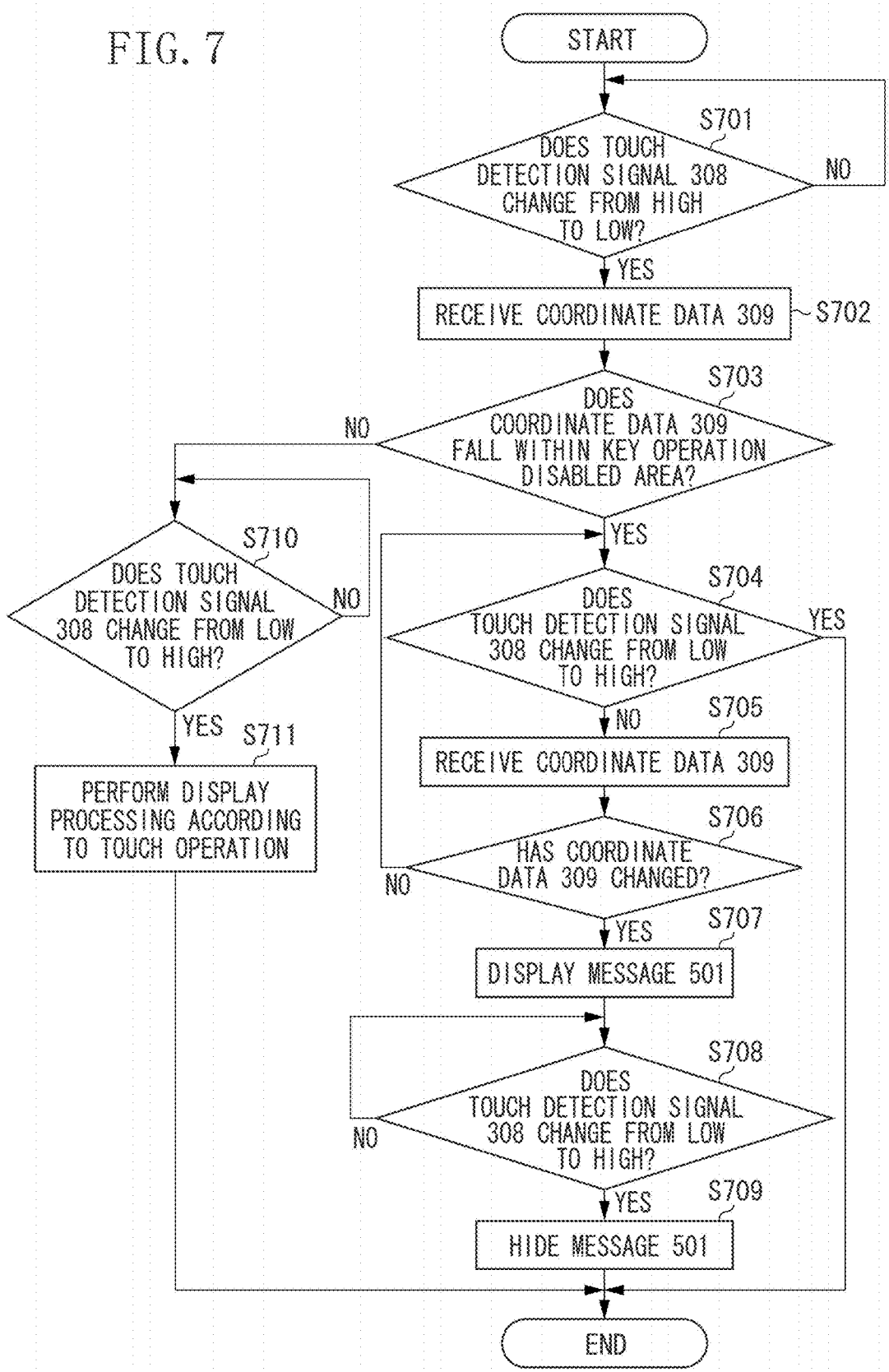
FIG. 7 is a flowchart illustrating a method for controlling the information processing apparatus.

FIG. 7 is a flowchart illustrating a method for controlling the information processing apparatus according to the present exemplary embodiment. This example deals with an example of processing of touch information about the operation panel 11 of the MFP 1.

Control to be performed to reflect the user's operation on the screen of the operation panel 11 if the user touches the touch sensor area 405 will be described below. The CPU 201 controls the following steps based on a program stored in the RAM 203 or loaded from the ROM 203 into the RAM 202.

In step S701, the CPU 201 checks whether the touch detection signal 308 received via the touch panel control unit 111 changes from high to low. If the touch detection signal 308 changes from high to low (YES in step S701), the processing proceeds to step S702. In step S702, the CPU 201 transmits the command 310 to the touch panel control unit 111 and receives the coordinate data 309 on the touch sensor area 405 via the touch panel control unit 111. In step S703, the CPU 201 collates the received coordinate data 309 with coordinate information registered in advance to determine whether the coordinate data 309 falls within the key operation disabled area.

If the CPU 201 determines that the received coordinate data 309 falls within the key operation disabled area (YES in step S703), the processing proceeds to step S704. In step S704, the CPU 201 determines whether the touch detection signal 308 changes from low to high. If the CPU 201 determines that the touch detection signal 308 changes from low to high (YES in step S704), the processing ends.

If the CPU 201 determines that the touch detection signal 308 remains low with no change (NO in step S704), the processing proceeds to step S705. In step S705, the CPU 201 transmits the command 310 to the touch panel control unit 111 and receives the coordinate data 309 on the touch sensor area 405.

In step S706, the CPU 201 compares the coordinate data 309 received in step S705 with the coordinate data 309 received in step S702 to determine whether the coordinate data 309 has changed. If the CPU 201 determines that the coordinate data 309 has not changed (NO in step S706), the processing returns to step S704.

If the CPU 201 determines that the coordinate data 309 has changed (YES in step S706), the processing proceeds to step S707. In step S707, the CPU 201 displays the message 501 illustrated in FIG. 5 on the screen of the LCD 113.

In step S708, the CPU 201 determines whether the touch detection signal 308 changes from low to high. If the CPU 201 determines that the touch detection signal 308 changes from low to high (YES in step S708), the processing proceeds to step S709. In step S709, the CPU 201 hides the message 501 illustrated in FIG. 5, which has been displayed on the screen of the LCD 113, and then the processing ends.

In step S703, if the CPU 201 determines that the coordinate data 309 falls outside the key operation disabled area, i.e., falls within a key operation enabled area (NO in step S703), the processing proceeds to step S710. In step S710, the CPU 201 determines whether the touch detection signal 308 changes from low to high. If the CPU 201 determines that the touch detection signal 308 changes from low to high (YES in step S710), the processing proceeds to step S711. In step S711, the CPU 201 performs display processing according to the touch operation, e.g., displays the copy operation screen. The processing then ends.

According to the present exemplary embodiment, if the user makes a key operation on the display area 403 while touching the key operation disabled area set on the touch panel 112, the message 501 is displayed on the screen of the LCD 113 for user notification. This can prevent the user from mistakenly thinking that the touch panel is broken during the touch panel operation of the MFP 1. The message 501 is displayed in a display mode according to display specifications of the LCD 113. For improved visibility, display control can be performed without departing from the scope of the present embodiments. For example, the foregoing message 501 can blink. If color display is available, display control can be performed to contrast the message 501 with other display screens by colors.

In the present exemplary embodiment, the display control is described to change the state in which the message 501 is displayed in step S707 to the state in which the message 501 is hidden at timing when the touch detection signal 308 changes from low to high. However, the display control can be performed to display the message 501 for a predetermined time, e.g., two seconds, after the touch detection signal 308 changes from low to high. This can reliably notify the user of the touch on the key operation disabled area even if the user quickly makes the second touch.

In the present exemplary embodiment, the second touch is determined by detecting a change in the coordinate data 309 after the user touches the key operation disabled area. However, the user can move the finger while touching the key operation disabled area without releasing it. If the CPU 201 determines that the coordinate data 309 received in step S705 falls within a peripheral area of the position where the user touches the key operation disabled area, then in step S706, the CPU 201 can perform control to determine that there is no change (NO in step S706).

A second exemplary embodiment will be described below. The first exemplary embodiment has been explained using an example in which the operation panel 11 is configured in such a manner that the touch sensor area 405 is also included in the printed area of the decoration film 402 below the display area 403, and the key operation disabled area lies where the decoration film 402 has no key printing.

Figure 8:
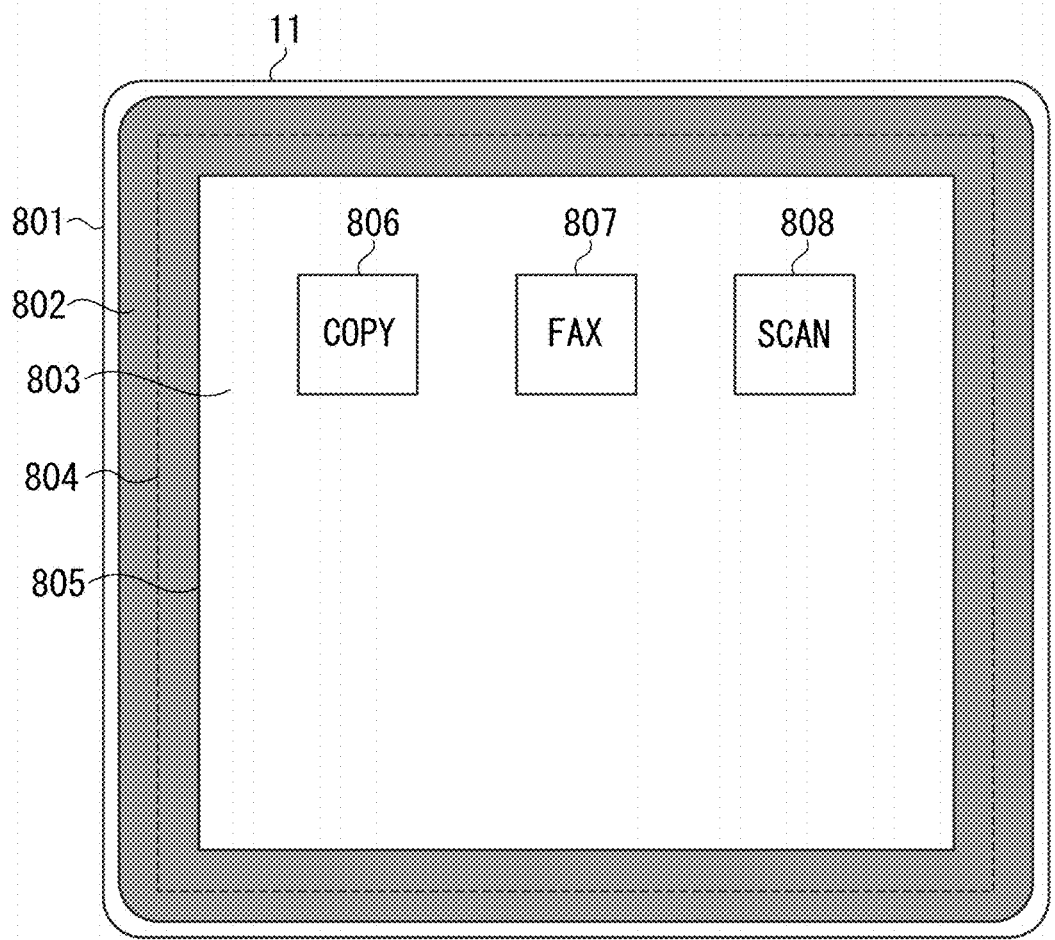
FIG. 8 is a diagram illustrating a display screen and a touch area of the information processing apparatus.

The second exemplary embodiment deals with control when, as illustrated in FIG. 8, a touch sensor area is arranged in a display area and key icons are displayed in part of the display area.

FIG. 8 is a diagram for describing a configuration of a touch panel in an information processing apparatus according to the present exemplary embodiment. The touch panel according to the present exemplary embodiment performs control for accepting an instruction to one key area selected from among a plurality of key areas according to a control procedure illustrated in FIG. 10 to be described below.

In FIG. 8, an operation panel 11 includes external covers 801 and 802. The external cover 802 is arranged on a touch panel 804. The touch panel 804 does not detect a touch if the user touches the external cover 802.

The external cover 802 includes an opening for a display area 803 of an LCD 113 so that the user can view the screen of the LCD 113 arranged under the touch panel 804. A touch sensor area 805 is formed over the touch panel 804.

If the operation panel 11 displays a home screen, key icons 806, 807, and 808 are displayed on the screen of the LCD 113. For example, if the user touches and releases the key icon 806, the CPU 201 presents a display indicating that the key icon 806 has been clicked and displays a copy operation screen (not illustrated) on the display area 803 via the control unit 20.

Key operations inside the display area 803 are disabled except on the key icons 806, 807, and 808. If the user touches such a key operation disabled area where key operations are disabled, the CPU 201 detects coordinate data 309 on the touch panel 804, but does not make any operation with respect to the operation panel 11.

For example, suppose that the user grips the left side of the operation panel 11 by the left hand and touches the key operation disabled area. If the user attempts a key operation with the right hand, the touch panel 804 is touched at a plurality of points and is thus unable to read accurate coordinate data on the key operation of the right hand. If no operation is made here, the user may mistakenly think that the MFP 1 is broken because the key operation attempted with the right hand gets no response. The larger the display area 803 is in size, the more likely the user is to unintentionally touch the key operation disabled area.

Figure 9:
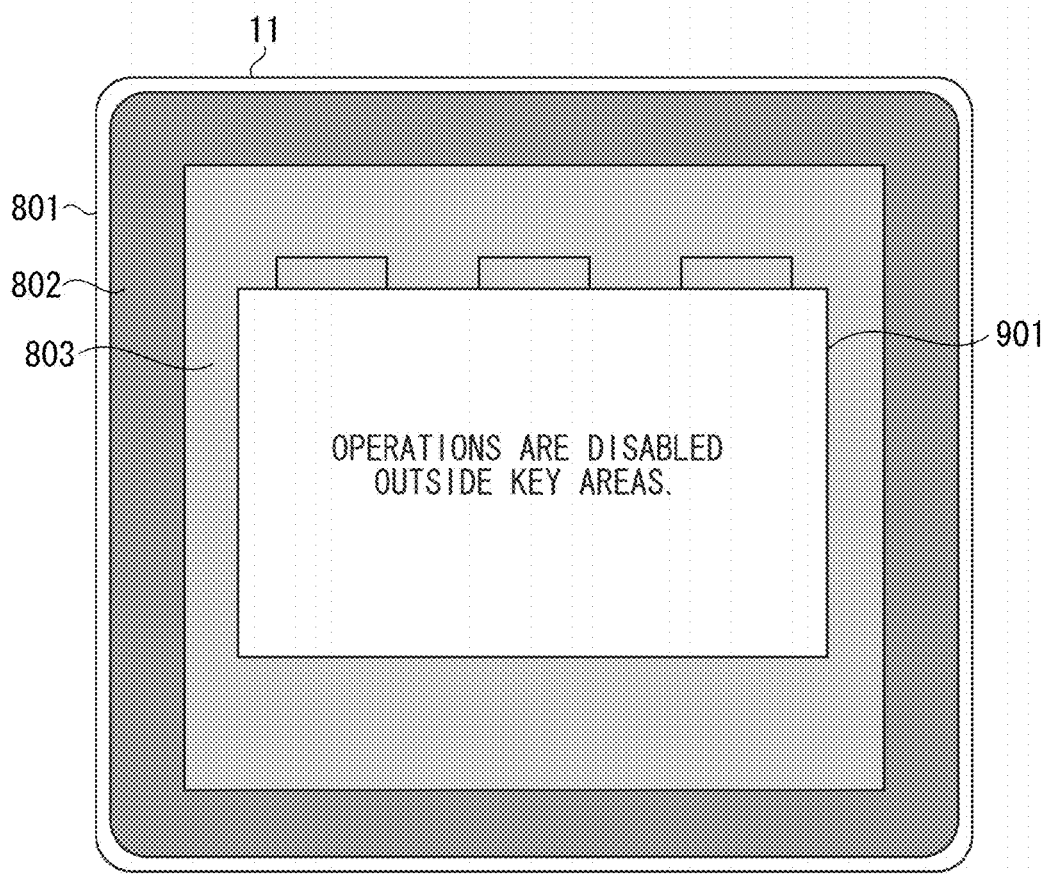
FIG. 9 is a diagram illustrating a message for notifying the user of a touch operation state.

In the second exemplary embodiment, if the user touches an area inside the display area 803 other than the key icon areas (key icons 806, 807, and 808), the CPU 201 detects whether the coordinate data 309 changes while the user touches the touch panel 112. If the CPU 201 detects a change in the coordinate data 309, the CPU 201 recognizes that the user is making an additional touch on the touch sensor area 805 while touching the display area 803 excluding the key icon areas. The CPU 201 then displays a message 901 illustrated in FIG. 9 on the screen of the LCD 113 for user notification. This enables the user to recognize that normal key operations are unable to be made because the user is operating while touching the key operation disabled area.

[Second Key Touch Input Processing]

Figure 10:
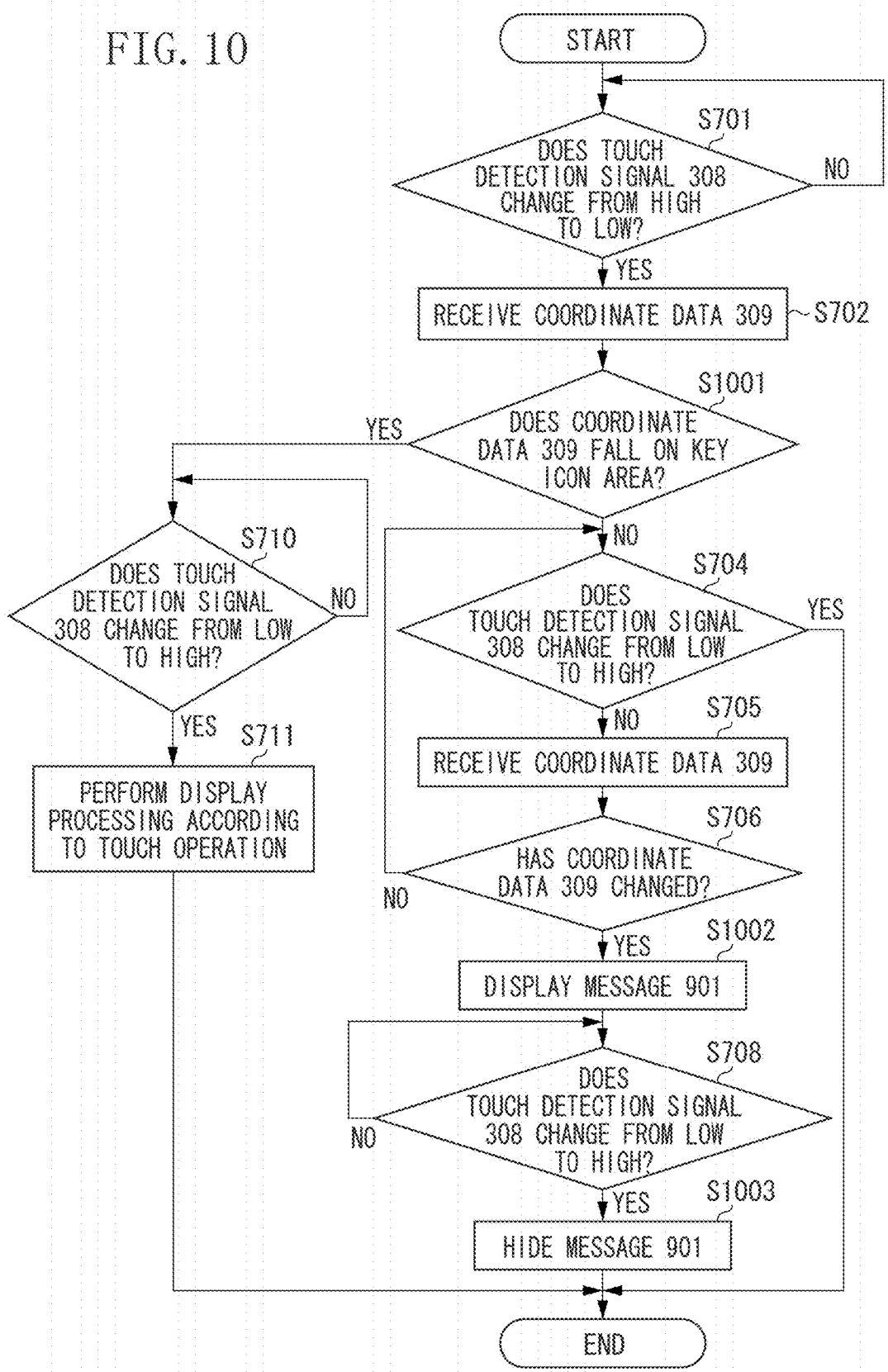
FIG. 10 is a flowchart illustrating a method for controlling the information processing apparatus.

FIG. 10 is a flowchart for describing a method for controlling the information processing apparatus according to the present exemplary embodiment. This example deals with an example of display control on the operation panel 11 of the MFP 1. Control to be performed to reflect the user's operation on the screen of the operation panel 11 when the user touches the touch sensor area 805 will be described. The steps are implemented by the CPU 201 executing a control program stored in the ROM 203 or loaded from the ROM 203 into the RAM 202. Steps similar to those illustrated in FIG. 7 are designated by the same step numbers. A description thereof will be omitted.

In step S1001, the CPU 201 determines whether the coordinate data 309 received in step S702 falls on a key icon area. If the CPU 201 determines that the coordinate data 309 does not fall on any key icon area (NO in step S1001), the processing proceeds to step S706 after execution of steps S704 and S705. In step S706, the CPU 201 compares the coordinate data 309 received in step S705 with the coordinate data 309 received in step S702. If the CPU 201 determines that the coordinate data 309 has not changed (NO in step 3706), the processing returns to step S704.

If the CPU 201 determines that the coordinate data 309 has changed (YES in step S706), the processing proceeds to step S1002. In step S1002, the CPU 201 displays the message 901 illustrated in FIG. 9 on the screen of the LCD 113 for user notification. In step S708, the CPU 201 determines whether the touch detection signal 308 changes from low to high. If the CPU 201 determines that the touch detection signal 308 changes from low to high (YES in step S708), the processing proceeds to step S1003. In step S1003, the CPU 201 performs control to hide the message 901 illustrated in FIG. 9 from the screen of the LCD 113. Specifically, the CPU 201 restores the screen to the one before the display of the message 901. The processing then ends.

According to the present exemplary embodiment, if the user makes a key operation while touching an area inside the display area 803 illustrated in FIG. 8 excluding the key icon areas, the message 901 can be displayed on the screen of the LCD 113 for user notification. This can effectively avoid situations in which the MFP 1 is mistakenly recognized to be broken.

The case described in the second exemplary embodiment in which the user touches an area inside the display area 803 excluding the key icon areas is also applicable to situations in which the user touches an area inside the display area 403 excluding the keys (key icon areas) in the first exemplary embodiment.

In the first and second exemplary embodiments, if the user touches the key operation disabled area while touching a key icon area in the display area 403 or 803, the touch panel 112 is touched at a plurality of points. In such a case, accurate coordinate data on the first-touched key icon (key) becomes unable to be read.

Similarly, if the user touches a key icon area in the display area 403 or 803 while touching another key icon area, the touch panel 112 or 804 is touched at a plurality of points. In such a case, accurate coordinate data on either of the key icons becomes unable to be read.

Figure 11:
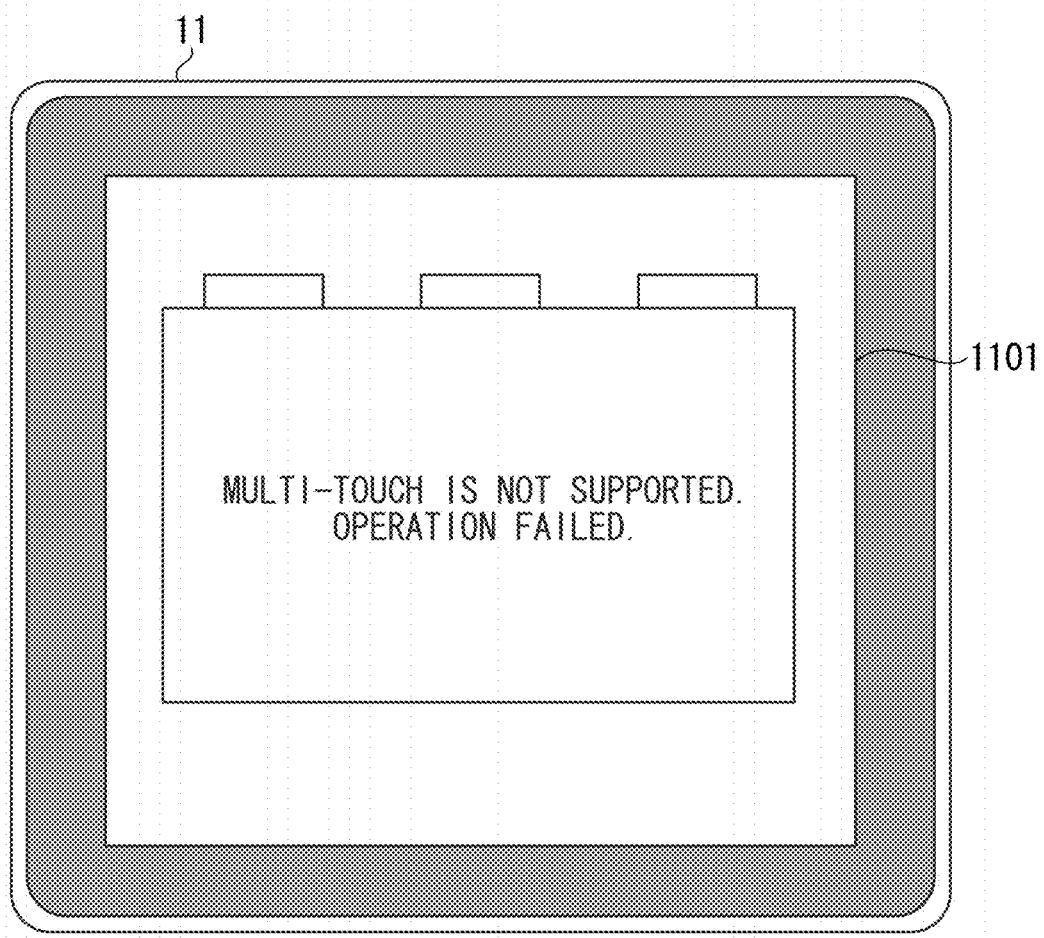
FIG. 11 is a diagram illustrating a message for notifying the user of a touch operation state.

In such situations, the CPU 201 is not able to determine whether the second-touched point is in the key operation disabled area. The CPU 201 then changes the contents of the message to be displayed from those of FIGS. 5 and 9. Specifically, the CPU 201 displays a message 1101 illustrated in FIG. 11 on the screen of the LCD 113 for user notification.

The foregoing first and second exemplary embodiments are described by using an information processing apparatus including a display device as an example. However, a display device can be configured to include a mechanism for performing the control illustrated in FIGS. 7 and 10 described above. In other words, an exemplary embodiment of the present invention is applicable to both an information processing apparatus and a display device.

The information processing apparatus can be applied to a mobile terminal that combines a touch panel sensor and a display device. Examples include a smartphone and a PDA.

A system in which a display device and another information processing apparatus communicate with each other may be configured.

According to the foregoing exemplary embodiments, if the user operates a touch panel, the user can be notified of a factor of change into a state of not accepting a touch operation so that a state of accepting a touch operation is restored.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-030670, filed Feb. 22, 2016, which is hereby incorporated by reference herein in its entirety.

What is claimed is:

1. A display device comprising:
a touch panel having a display screen and configured to have an area for detecting a touch operation by a user, the area containing an area in which one or more icons for accepting a touch operation from the user are to be displayed to instruct execution of associated processing and an area in which the one or more icons are not to be displayed; and
a display control unit configured to control the display screen to display a screen for notifying the user that a touch operation is being detected on the area in which the one or more icons are not displayed, in a case where a touch operation is detected on the area in which the one or more icons are to be displayed while the touch operation is being detected on the area in which the one or more icons are not to be displayed.

2. The display device according to claim 1, further comprising a determination unit configured to determine whether a touch operation is performed on an area in which the touch operation on the touch panel is to be detected by monitoring coordinate information to be output from the touch panel in the area.

3. The display device according to claim 2, wherein the determination unit is configured to determine whether the touch operation is detected on the area in which the one or more icons are to be displayed while the touch operation is being detected on the area in which the one or more icons are not to be displayed, by monitoring the coordinate information to be output from the touch panel.

4. The display device according to claim 1, wherein the display control unit is configured to control the display screen to display a screen for notifying the user that processing based on a plurality of instructions is not to be performed in a case where the touch operation is detected on the area in which the one or more icons are to be displayed while the touch operation is being detected on the area in which the one or more icons are not to be displayed.

5. A method for controlling a display device including a touch panel having a display screen and configured to have an area for detecting a touch operation by a user, the area containing an area in which one or more icons for accepting a touch operation from the user are to be displayed to instruct execution of associated processing and an area in which the one or more icons are not to be displayed, the method comprising:
controlling the display screen to display a screen for notifying the user that a touch operation is being detected on the area in which the one or more icons are not displayed, in a case where a touch operation is detected on the area in which the one or more icons are to be displayed while the touch operation is being detected on the area in which the one or more icons are not to be displayed.

6. A non-transitory computer-readable storage medium storing computer-executable instructions for performing a method for controlling a display device including a touch panel having a display screen and configured to have an area for detecting a touch operation by a user, the area containing an area in which one or more icons for accepting a touch operation from the user are to be displayed to instruct execution of associated processing and an area in which the one or more icons are not to be displayed, the method comprising:
controlling the display screen to display a screen for notifying the user that a touch operation is being detected on the area in which the one or more icons are not displayed, in a case where a touch operation is detected on the area in which the one or more icons are to be displayed while the touch operation is being detected on the area in which the one or more icons are not to be displayed.

* * * * *